(12) United States Patent
Schögler

(10) Patent No.: US 10,411,540 B2
(45) Date of Patent: Sep. 10, 2019

(54) STATOR OF AN ELECTRIC MOTOR

(71) Applicant: SECOP Austria GmbH, Furstenfeld (AT)

(72) Inventor: Hans-Peter Schögler, Fehring (AT)

(73) Assignee: SECOP AUSTRIA GMBH, Furstenfeld (AT)

( * ) Notice: Subject to any disclaimer, the term of this patent is extended or adjusted under 35 U.S.C. 154(b) by 352 days.

(21) Appl. No.: 15/305,311

(22) PCT Filed: Apr. 22, 2015

(86) PCT No.: PCT/AT2015/050099
§ 371 (c)(1),
(2) Date: Oct. 19, 2016

(87) PCT Pub. No.: WO2015/161331
PCT Pub. Date: Oct. 29, 2015

(65) Prior Publication Data
US 2017/0040860 A1 Feb. 9, 2017

(30) Foreign Application Priority Data

Apr. 22, 2014 (AT) .............................. GM50061/2014

(51) Int. Cl.
*H02K 3/28* (2006.01)
*H02K 3/04* (2006.01)
(Continued)

(52) U.S. Cl.
CPC .............. *H02K 3/28* (2013.01); *H02K 1/146* (2013.01); *H02K 3/02* (2013.01); *H02K 3/04* (2013.01);
(Continued)

(58) Field of Classification Search
CPC .. H02K 3/02; H02K 3/04; H02K 3/12; H02K 3/18; H02K 3/20; H02K 3/28
(Continued)

(56) References Cited

U.S. PATENT DOCUMENTS 4,100,444 A * 7/1978 Boyd, Jr. ................. H02K 3/28
310/184
7,772,737 B1 8/2010 Fakonas
(Continued)

FOREIGN PATENT DOCUMENTS

DE 10 2008 051 320 A1 4/2010
DE 10 2014 109 190 A1 1/2015
(Continued)

OTHER PUBLICATIONS

SECOP Austria GMBH, "International Search Report", PCT/AT2015/050099, filed Apr. 22, 2015. 2 pages.
(Continued)

*Primary Examiner* — Jeremy A Luks
(74) *Attorney, Agent, or Firm* — McKee, Voorhees & Sease, PLC

(57) ABSTRACT

Stator (1) of an electric motor, in particular an electric motor for refrigerant compressors, the stator (1) comprising a coil, the coil comprising windings (3), where at least one of the windings (3) comprises two wires (4, 5) of different materials that are electrically connected in parallel, where the windings (3) are disposed at least in sections in mounting slots (2) of the stator (1). It is provided according to the invention that the mounting slots (2) each have a mounting cross section (8) with a mounting cross-sectional area $A_{AQ}$, within which the windings (3) are disposed and cover a total cross-sectional area $A_{total}$, where a degree of filling F is given as the ratio of the total cross-sectional area to the mounting cross-sectional area
(Continued)

$F = A_{total}/A_{AQ}$ and where the coil is designed so that for a given power and/or given efficiency of the electric motor, the degree of filling F is greater in at least one mounting slot (2) than the highest degree of filling F in the case of an alternative coil that has exactly as many windings, but which windings consist of wires of only one material.

9 Claims, 4 Drawing Sheets

(51) Int. Cl.
  *H02K 3/12* (2006.01)
  *H02K 3/02* (2006.01)
  *H02K 3/18* (2006.01)
  *H02K 1/14* (2006.01)
  *H02K 7/14* (2006.01)

(52) U.S. Cl.
  CPC .................. *H02K 3/12* (2013.01); *H02K 3/18* (2013.01); *H02K 7/14* (2013.01); *H02K 2213/03* (2013.01)

(58) Field of Classification Search
  USPC .................................................. 310/195–208
  See application file for complete search history.

(56) References Cited

U.S. PATENT DOCUMENTS

| 9,413,200 B2 * | 8/2016 | Horisaka | H02K 3/18 |
| 2009/0214363 A1 * | 8/2009 | Noh | H02K 17/08 |
| | | | 417/423.7 |

FOREIGN PATENT DOCUMENTS

| JP | 10174330 A | 6/1998 |
| WO | 2014188466 A1 | 11/2014 |
| WO | 2015161331 A2 | 10/2015 |

OTHER PUBLICATIONS

SECOP Austria GMBH, "Search Report", GM 50061/2014, filed Apr. 22, 2014. 1 page.

* cited by examiner

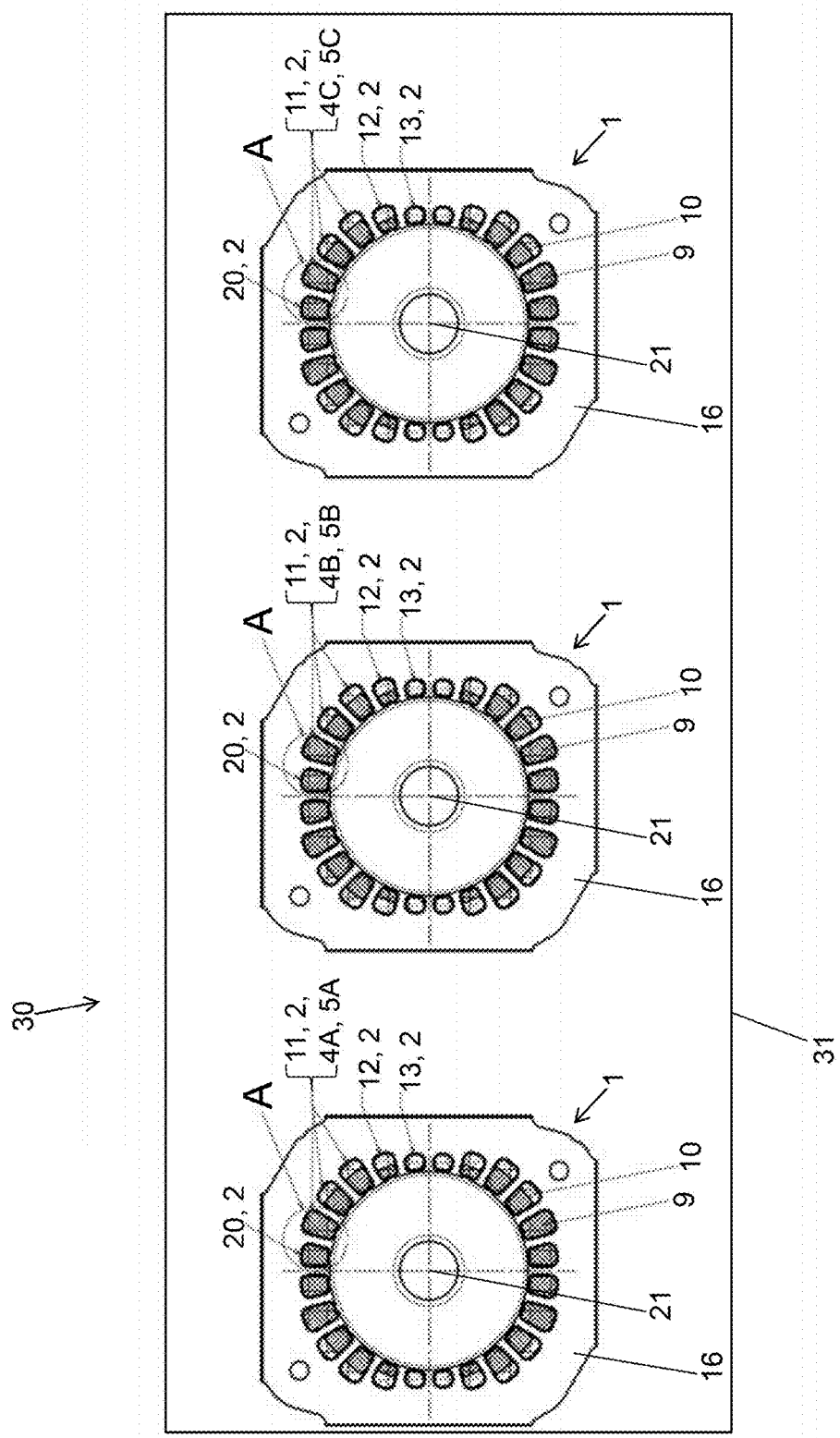

STATOR OF AN ELECTRIC MOTOR

FIELD OF THE INVENTION

This invention concerns a stator of an electric motor, namely an electric motor for a refrigerant compressor, the stator comprising a coil, the coil comprising windings, where at least one of the windings comprises wires of different materials that are connected electrically in parallel, where the windings are disposed at least in sections in mounting slots of the stator.

BACKGROUND OF THE INVENTION

Electric motors usually have coils with windings made of wire. The windings can in particular be stator windings, but can also be rotor, or armature, windings.

Basically, only one wire is used for the windings of such coils. However, in particular, in the field of refrigerant compressors, two identical wires, each of smaller diameter, for example, 0.5 mm, which are connected electrically in parallel, are used instead of one somewhat thicker wire, with a diameter of 0.7 mm, for example. This may prove necessary, for example in the case of a stator whose mounting slots for accommodating the windings have a slot opening that is not large enough to insert the somewhat thicker wire.

The coils or windings typically consist of wires made of copper (Cu) or aluminum (Al). Cu has the advantage of a lower electrical resistivity ρ than Al, so that compact electric motors with high power and high efficiency can be realized. On the other hand, Al has the advantage of lower material costs. A limiting factor for using Al in particular is the space available for the coil or windings, since an Al wire has, for a given length and given electrical resistance R, a cross-sectional area that is about 65% greater than that of a Cu wire.

If therefore, for example, in the case of a stator winding with Cu wire, the mounting slots each have a mounting cross section with a mounting cross-sectional area $A_{AQ}$ that is filled to 61% or more by the winding—in this connection one also speaks of the degree of filling, said coil can no longer be replaced by a coil with Al wire. This means that, to achieve a desired power and/or a desired efficiency of the electric motor, although the mounting slots of the stator are nowhere near completely filled with the Cu wire, it will not be possible to replace the Cu wire with an Al wire, so that comparably high material costs must be accepted.

OBJECTIVE OF THE INVENTION

This invention therefore has the objective of making available a stator with a winding that avoids the above disadvantages and is especially cost effective. In particular, it should become possible to achieve maximum degrees of filling without changing the stator design for different electric motor powers and/or efficiencies that are to be achieved.

SUMMARY OF THE INVENTION

The core of the invention is the idea of providing coils with windings in which wires of different materials are used, where the wires are connected electrically in parallel. A winding here is understood to mean one turn of the coil.

If, therefore, for a given power to be achieved and/or a given efficiency to be achieved in an electric motor, for example, a complete replacement of a winding of a stator or a rotor or armature of Cu by a winding of Au is not possible for reasons of space, a winding according to the invention having Cu and Al wires that are connected electrically in parallel can be used. The wires are connected to each other by crimping and/or by soldering.

The sizes or thicknesses of the wires can be chosen so that optimum space utilization and thus the greatest possible cost savings take place.

The winding according to the invention can be used, for example, as winding in a rotor and/or stator. The use as stator winding enables electric motors that have quite varying power and/or efficiencies to be realized and at the same time allows material costs to be kept as low as possible, for example, with a single design of the stator or coil core of the stator—in particular with regard to the design of the mounting slots.

For maximum cost savings, for a given power and/or given efficiency of the electric motor that is to be achieved, utilization of the available space by appropriately high use of wires of a cheap material can be maximized, thus by a correspondingly high proportion of Al in an embodiment with Al and Cu wires connected electrically in parallel. Correspondingly, in the case of a stator of an electric motor, in particular an electric motor for refrigerant compressors, the stator comprising a coil, the coil comprising windings, where at least one of the windings comprises two wires of different materials that are connected electrically in parallel, where the windings are at least disposed in sections in the mounting slots of the stator, it is provided in accordance with the invention that the mounting slots each have a mounting cross section with a mounting cross-sectional area $A_{AQ}$ within which the windings are disposed and that cover a total cross-sectional area $A_{total}$, where a degree of filling F is given as the ratio of the total cross-sectional area to the mounting cross-sectional area $$F = A_{total}/A_{AQ}$$

and where the coil is made so that for a given power and/or given efficiency of the electric motor, the degree of filling F is higher in at least one mounting slot than the highest degree of filling in the case of a winding with exactly the same number of windings made of wires of only one material. For example, a coil according to the invention with windings that have Cu and Al wires connected electrically in parallel is made so that for the same power and/or same efficiency, a higher degree of filling results than in the case of a coil with the same number N of windings with only Cu wires. In this regard, the cross-sectional areas or diameters of the Cu and Al wires in particular are chosen so that a maximum degree of filling for a given power and/or given efficiency of the electric motor results.

Of course, windings with more than two wires connected electrically in parallel are also possible, for example three of four wires. However, what is crucial is that at least two of these wires are made of different materials, where the materials preferably have different resistivities. Basically, in this case, quite varied materials are conceivable, for example even silver and/or iron.

Because of the very good electric conductivity of Cu, it is provided in a preferred embodiment of the stator according to the invention that one of the wires connected electrically in parallel is a Cu wire.

Al offers a great potential for material cost savings while having a relatively good conductivity. This is why it is provided in a preferred embodiment of the stator according to the invention that one of the wires connected electrically in parallel is an Al wire.

In order in particular to take into account the different resistivities of the materials that are used and preferably to achieve an essentially equal resistivity of each of the wires that are electrically connected in parallel, it is provided in a preferred embodiment of the stator according to the invention that the two wires connected electrically in parallel have cross sections with different cross-sectional areas perpendicular to their lengthwise axis. Of course, the cross sections or cross-sectional areas of the wires are also governed by the available space conditions for the winding.

The cross sections of the wires can basically have any shape, for example elliptical or rectangular. This can sometimes prove useful in order to fill an available space, for example in a mounting slot, in the best way possible. Because of ready availability, it is provided in a preferred embodiment of the stator according to the invention that the cross sections of the two wires connected electrically in parallel are circular and have different diameters. However, cases in which essentially the same diameters are used are also conceivable.

Since very high degrees of filling can be achieved in the described way, it is provided in an especially preferred embodiment of the stator according to the invention that for the degree of filling in the at least one mounting slot (2) $F \geq 0.8$, preferably $F \geq 0.85$, especially preferably $F \geq 0.9$. The mounting slots can, basically speaking, have different degrees of filling. In practice, said degrees of filling vary only negligibly, for example by 1% to 2%.

In particular in the field of refrigerant compressors, it is a frequent task to make available electric motors that have different power and/or different efficiency in correspondence with the different powers and/or efficiencies of the refrigerant compressors. A refrigerant compressor comprising an electric motor with a stator according to the invention is provided according to the invention to achieve this objective.

BRIEF DESCRIPTION OF THE FIGURES

The invention will now be explained in more detail by means of an embodiment example. The drawings are by way of example and are intended to represent the ideas of the invention, but not in any way to limit them or to render it in a final form at all.

Here:

FIG. 6 is an illustration of a kit of a plurality of refrigerant compressors according to aspects of the present invention.

EMBODIMENTS OF THE INVENTION

Figure 1:
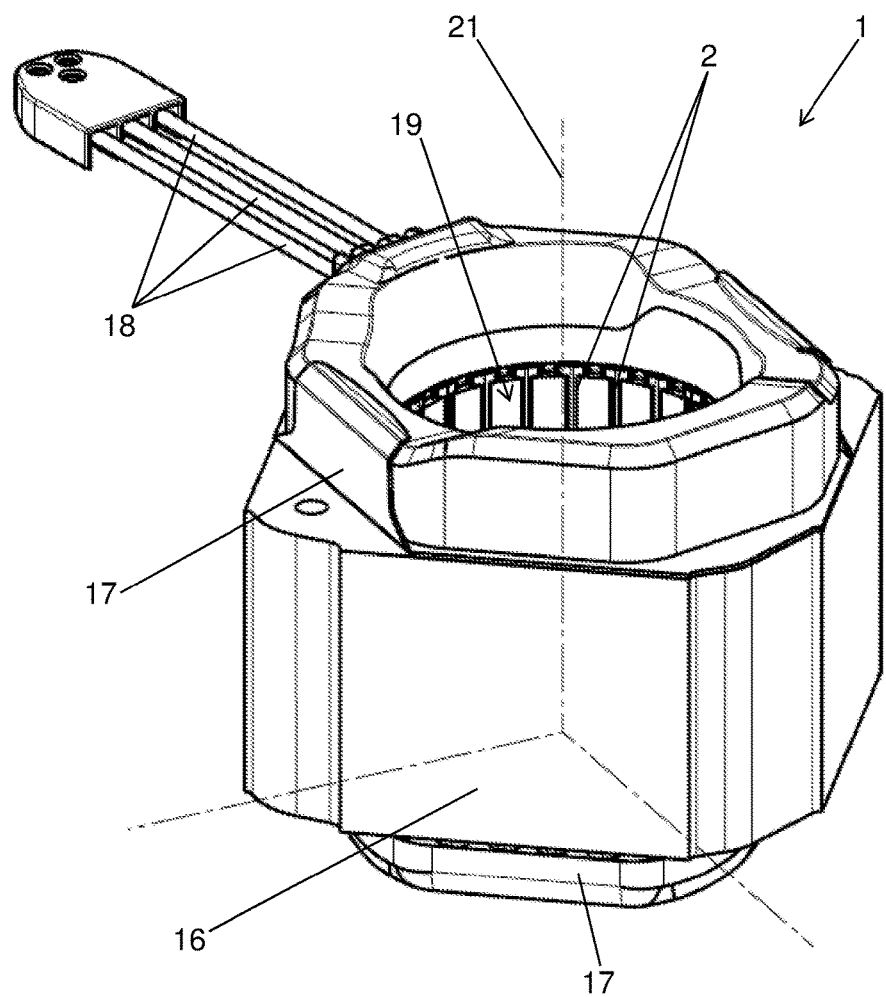
FIG. 1 shows an axonometric view of a stator according to the invention of an electric motor for a refrigerant compressor.

FIG. 1 shows a stator 1 of an electric motor of a refrigerant compressor in an axonometric view. The stator 1 has a stator drilling 19 for accommodation of a rotor (not shown) rotating about an axis of rotation 21. The stator 1 comprises a coil core 16 with mounting slots 2, which serve to hold the windings 3 (see FIGS. 4 and 5) of a coil, also called the stator coil. The resulting end windings can be covered with insulation 17, which electrically insulates the coil heads from components outside of the stator 1, in particular a compressor housing (not shown). Further, in FIG. 1 one can see electrical conductors 18, which serve for electrical connection of the coil or for power supply.

Figure 2:
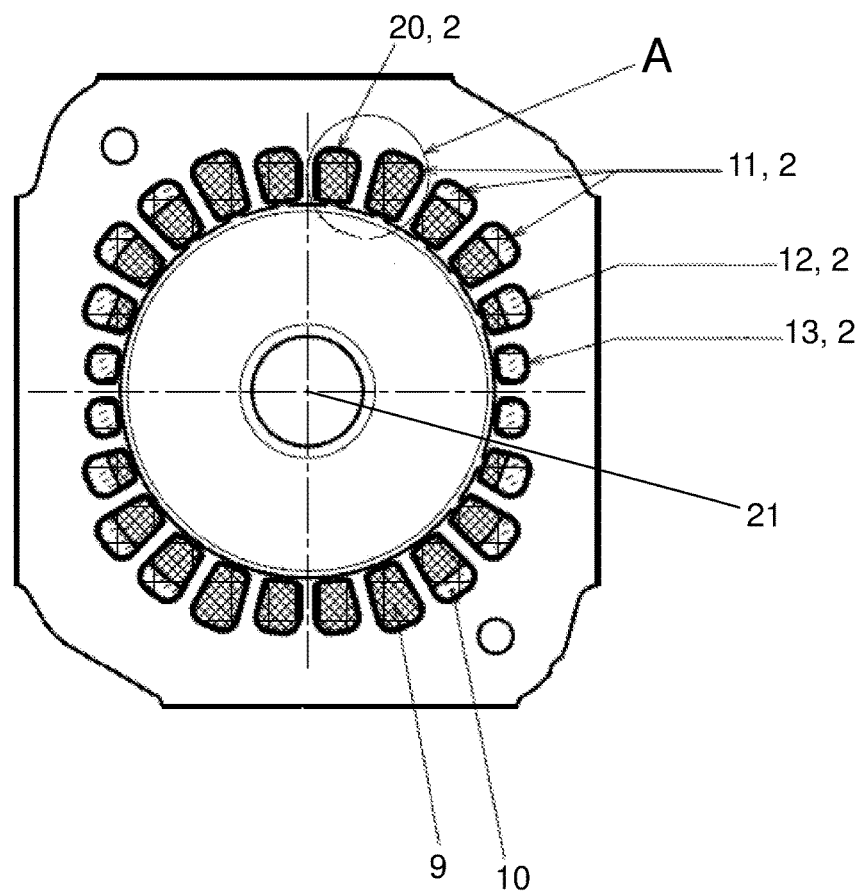
FIG. 2 shows a sectional view of the stator in FIG. 1.

FIG. 2 shows a sectional view of the stator 1 perpendicular to the axis of rotation 21, in which the mounting slots 2 can be seen very clearly. The mounting slots 2 are not necessarily all made the same, rather they can, as illustrated in FIG. 2, be designed differently. Specifically, in the embodiment example of FIG. 2, mounting slots 2 of a first type 20, a second type 11, a third type 12, and a fourth type 13 can be seen. Slot types 20, 11, 12, and 13 differ essentially in the shape and size of their cross sections normal to the axis of rotation 21.

The windings of the coil are situated in the mounting slots 2, where the coil in the embodiment example of FIG. 2 consists of a primary winding 9 and a secondary winding 10. The secondary winding 10 is provided for startup and/or for partial operation of the electric motor, which is preferably made as a single phase asynchronous motor, in that the secondary winding 10 generates a magnetic field that is phase shifted in time with respect to the primary winding 9. In order to generate a rotating field in stator 1 and to induce in the rotor (not shown) a voltage responsible for the rotor's rotary motion, the alternating fields arising in the primary winding 9 and the secondary winding 10 must be offset from each other in space and time.

Figure 3:
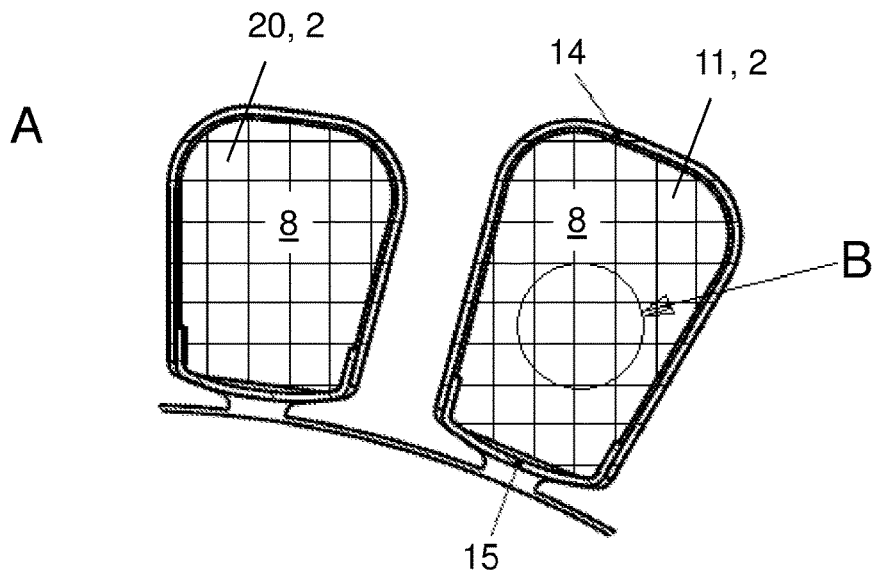
FIG. 3 shows an enlarged view of detail A in FIG. 2.

FIG. 3 shows an enlarged view of detail A in FIG. 2 with mounting slots 2 of the first type 20 and the second type 11. The winding slots 2 each have a slot opening 15, through which the windings 3 of the winding are inserted into the mounting slots 2. One can see in FIG. 3 that the mounting slots 2 have insulation 14, in order to electrically insulate the windings 3 additionally from the coil core 16—windings 3 usually have a varnish coating for electrical insulation. Since the insulation 14 requires a certain, albeit very small, space within the mounting slots 2, there correspondingly remains in each mounting slot 2 a certain mounting cross section 8, which is available for accommodating the windings 3 in each mounting slot 2 and which has a mounting cross-sectional area $A_{AQ}$.

Figure 4:
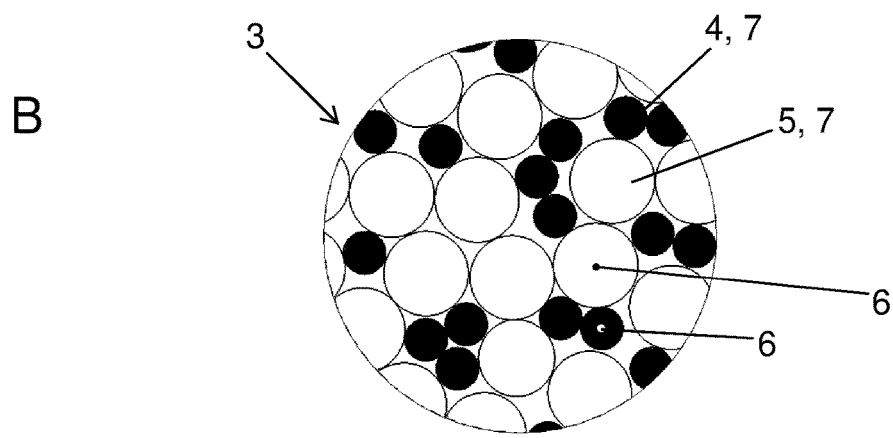
FIG. 4 shows an enlarged view of detail B in FIG. 3.

The windings 3, which can be seen in detail in FIG. 4 in the enlarged view of detail B from FIG. 3, do no, however, fill the entire mounting cross section 8. That is, all of the windings 3 within the mounting cross section 8 cover a total cross-sectional area $A_{total}$ that is smaller than the mounting cross-sectional area $A_{AQ}$. Thus, for the relevant mounting slot 2, a degree of filling F can be defined as the ratio between the total cross-sectional area $A_{total}$ and the mounting cross-sectional area $A_{AQ}$:

$$F = A_{total}/A_{AQ}.$$

In order to maximize the degree of filling F and to save on material costs for a given power and/or given efficiency of the electric motor, the coil is made according to the invention with windings of wires of different materials that are connected electrically in parallel.

Figure 5:
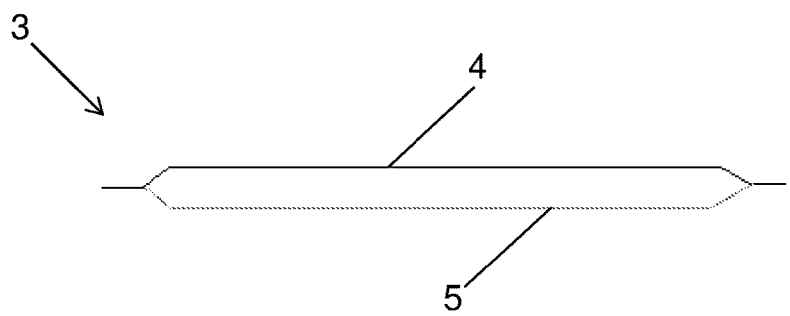
FIG. 5 shows a schematic representation of a portion of a winding of a coil according to the invention.

FIG. 5 shows a detail of such a winding 3, which comprises a Cu wire 4 and an Al wire 5 that is electrically connected in parallel to it. Preferably, the Cu wire 4 and the Al wire 5 have cross sections 7 with different cross-sectional areas 7 perpendicular to their lengthwise axis 6. In this embodiment example, the cross sections 7 of the Cu wire 4 and the Al wire 5 are circular, and the diameter D of the Al wire 5 is larger than the diameter d of the Cu wire 4, as can be seen in particular in FIG. 4. The wires 4 and 5 each have a varnish layer for electrical insulation, which is not shown in FIG. 4 and is included in the diameters D and d.

For example, for a given power and/or efficiency of an electric motor with a coil in which only one Cu wire with a diameter d'=0.55 mm (including varnish layer) is used, with N=113 windings, a filling factor F≈0.7 is achieved. According to the invention, instead of this, a winding with also N=113 windings 3 with a Cu wire 4 having a diameter d=0.375 mm (including varnish layer) and an Al wire 5 connected electrically in parallel to it, having diameter D=0.5 mm (including varnish layer) can be used, through which a filling factor F≈0.95 is achieved. Through this, a highest possible material cost savings can be realized for the same power and/or the same efficiency of the electric motor without having to change the design of the stator 1, especially with regard to the design of the mounting slots 2. That is, with a single coil core 16 or with a single design of the coil core 16, electric motors of different power and/or efficiency can be realized, and at the same time the material costs can be kept as low as possible.

It should be noted that in determining the degrees of filling, the relevant total cross-sectional area $A_{total}$ can in practice be approximately calculated as $$A_{total}=N \cdot d'^2$$

or $$A_{total}=N \cdot (d^2+D^2).$$

FIG. 6 diagrammatically depicts a kit 30 that includes a plurality of refrigerant compressors in packaging 31, each having an electric motor with a stator 1, wherein each electric motor has the same coil core 16, but the electric motors have different power and/or different efficiency. I.e. different electric motor powers and/or efficiencies are achieved without changing the stator design, making available electric motors that have different power and/or different efficiency in correspondence with different powers and/or efficiencies of refrigerant compressors.

The different power and/or different efficiency is achieved by using different windings having wires of different materials that are electrically connected in parallel, wherein said windings allow for high filling degrees. In FIG. 6 the different windings are exemplarily indicated by means of Cu wires 4A and Al wires 5A of the winding in the mounting slot 11 of the first shown coil core 16, Cu wires 4B and Al wires 5B of the winding in the mounting slot 11 of the second shown coil core 16, and Cu wires 4C and Al wires 5C of the winding in the mounting slot 11 of the third shown coil core 16.

REFERENCE NUMBER LIST

1 Stator
2 Mounting slot
3 Winding
4 Cu wire
5 Al wire
6 Lengthwise axis of a wire
7 Cross section of a wire
8 Mounting cross section
9 Main winding
10 Secondary winding
11 Mounting slot, second type
12 Mounting slot, third type
13 Mounting slot, fourth type
14 Insulation of mounting slot
15 Slot opening
16 Coil core
17 Insulation of coil head
18 Electrical conductor
19 Stator drilling
20 Mounting slot, first type
21 Axis of rotation

The invention claimed is:

1. A refrigerant compressor comprising an electric motor with a stat or, the stator comprising a coil, the coil comprising windings, characterized in that
at least one of the windings comprises two wires of different materials that are electrically connected in parallel,
where the windings are disposed at least in sections in mounting slots of the stator,
where the mounting slots each have a mounting cross section having a mounting cross-sectional area $A_{AQ}$, within which the windings are disposed and cover a total cross-sectional area $A_{total}$,
where a degree of filling F is defined as the ratio of the total cross-sectional area to the mounting cross-sectional area $$F=A_{total}/A_{AQ}$$

and
where the coil is designed so that for a given power and/or a given efficiency of the electric motor, the degree of filling F is greater in at least one mounting slot than the highest degree off fling F in the case of an alternative coil that has exactly as many windings consisting of wires of only one material.

2. The refrigerant compressor as in claim 1, characterized in that one of the wires electrically connected in parallel is a Cu wire.

3. The refrigerant compressor as in claim 1, characterized in that one of the wires electrically connected in parallel is an Al wire.

4. The refrigerant compressor as in claim 1, characterized in that the two wires that are electrically connected in parallel have cross sections with different cross-sectional areas normal to their lengthwise axes.

5. The refrigerant compressor as in claim 4, characterized in that the cross sections of the two wires that are electrically connected in parallel are circular and have different diameters.

6. The refrigerant compressor as in claims 1, characterized in that for the degree of filling in the at least one mounting slot comprises F≥0.8.

7. A kit of a plurality of refrigerant compressors comprising at least one refrigerant compressor as in claims 1, characterized in that the stators of the electric motor have the same coil cores, but the electric motors have different power and/or different efficiency.

8. The refrigerant compressor as in claim 1, characterized in that for the degree of filling in the at least one mounting slot comprises F>0.85.

9. The refrigerant compressor as in claim 1, characterized in that for the degree of filling in the at least one mounting slot comprises F>0.9.

* * * * *

UNITED STATES PATENT AND TRADEMARK OFFICE
CERTIFICATE OF CORRECTION

PATENT NO. : 10,411,540 B2
APPLICATION NO. : 15/305311
DATED : September 10, 2019
INVENTOR(S) : Hans-Peter Schögler Page 1 of 1

It is certified that error appears in the above-identified patent and that said Letters Patent is hereby corrected as shown below:

In the Claims

In Column 6, Claim 1, Line 11:
DELETE "stat or" after the first "a"
INSERT --stator-- after the first "a"

In Column 6, Claim 1, Line 31:
DELETE "off fling" after "degree"
INSERT --of filling-- after "degree"

In Column 6, Claim 6, Line 48:
DELETE "claims" after "in"
INSERT --claim-- after "in"

In Column 6, Claim 7, Line 52:
DELETE "claims" after "in"
INSERT --claim-- after "in"

Signed and Sealed this
Fifteenth Day of October, 2019

Andrei Iancu
*Director of the United States Patent and Trademark Office*